United States Patent [19]

Prichard

[11] 4,243,328
[45] Jan. 6, 1981

[54] TRAILER TRANSIT MIXER

[75] Inventor: Evan S. Prichard, Newport Beach, Calif.

[73] Assignee: Challenge-Cook Bros. Incorporated, Industry, Calif.

[21] Appl. No.: 57,650

[22] Filed: Jul. 16, 1979

[51] Int. Cl.³ .................. B28C 5/20; B28C 5/42
[52] U.S. Cl. .................... 366/62; 280/404; 280/405 A
[58] Field of Search ............ 366/54, 62, 63, 60, 366/61, 55, 220, 233, 606; 280/404, 405 A, 401

[56] References Cited

U.S. PATENT DOCUMENTS

| | | |
|---|---|---|
| 3,019,002 | 1/1962 | Prichard .................. 366/62 |
| 3,038,704 | 6/1962 | Cook ...................... 280/401 |
| 3,112,100 | 11/1963 | Prichard .................. 366/41 |
| 3,567,189 | 3/1971 | Buelow .................... 366/62 |
| 3,658,303 | 4/1972 | Funk ...................... 366/62 |
| 3,706,464 | 12/1972 | Burrows .................. 280/401 |

Primary Examiner—Robert W. Jenkins
Attorney, Agent, or Firm—Lyon & Lyon

[57] ABSTRACT

A trailer transit mixer including two oppositely positioned pairs of support members pivotably attached to a center frame and to forward and rear wheel structures. Power means extending between and secured to the pairs of support members and the center frame when activated cause pivoting of the support members to contract the trailer transit mixer.

12 Claims, 8 Drawing Figures

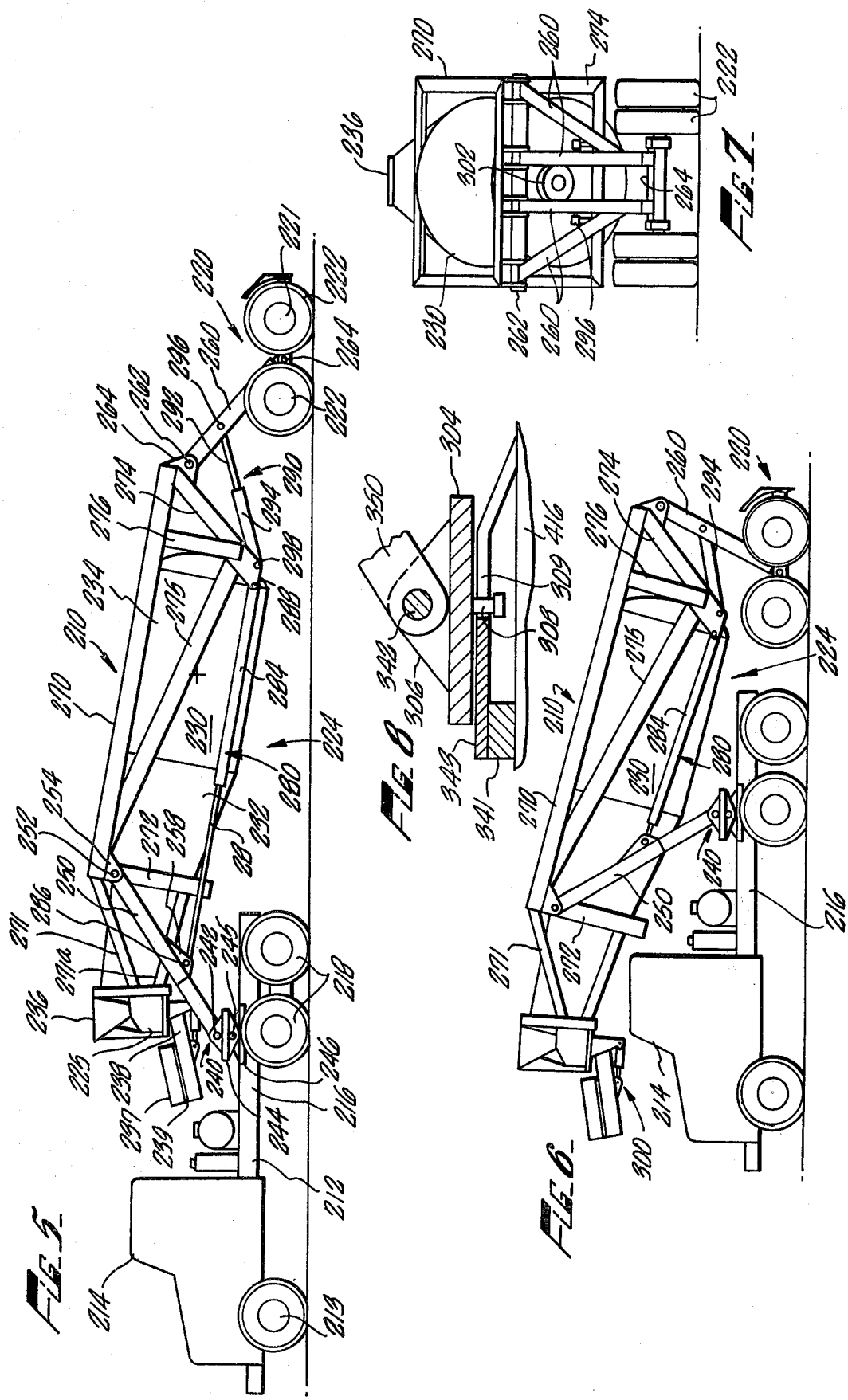

TRAILER TRANSIT MIXER

BACKGROUND OF THE INVENTION

This invention relates to a transit mixer, and more particularly to a contractible-extendable trailer transit mixer adapted to discharge forwardly of the truck.

The necessity for moving large quantities of building material such as concrete for long distances has resulted in various styled trucks designed to address particular requirements. These truck designs were of two basic types. First, and most popular, the mixer drum was mounted on the truck body thereby providing acceptable maneuverability of the vehicle. Second, the mixer drum was mounted on a trailer portion, which was then secured to the truck. This trailer configuration resulted in greater pay load capability due to better axel load characteristics but sacrificed maneuverability.

The previous forms of trailer transit mixers consisted of a trailer upon which a mixer drum was mounted, which held the pay load during transit, and U.S. Pat. No. 3,038,704 illustrates one such trailer unit. An engine or other drive mechanism was connected to the mixer drum to cause rotation and provide the desired mixing necessary for the concrete. The mixer drum was positioned on the trailer with the open end at either the front or rear with discharge chutes mounted at the open end to discharge concrete at the front or rear of the trailer depending upon the operational characteristics desired. In the configuration of U.S. Pat. No. 3,038,704, the drum was rotatably mounted to point forward on a trailer which was slidably engaged with the truck. However, this form had severely impaired turning capabilities when in the contracted configuration due to the contracted trailer portion extending along side the truck cab.

Other trailer type devices have been used with transit mixers to increase the payload carried by the mixer drum, such as those of U.S. Pat. Nos. 3,019,002 and 3,112,100, but the prior art trailer devices had certain limitations and undesirable characteristics.

Due to the highway regulations of the Federal Government and all states, there are severe restrictions on the size and loading of trucks and trailers that use public roads. In particular, various limitations exist on the weight per axle per unit length of truck allowable on public highway facilities. For example, the Federal highway regulations provide weight limitations of less than 80,000 lbs. for vehicles, regardless of the number of axles, of a length less than 50 feet 6 inches between the extreme spaced axles. With extreme axle spacing of 51 feet or longer, a total weight of 80,000 lbs. is allowable. Therefore, by simply making the transit mixer drum larger, thereby increasing the payload and weight but without increasing the length, the manufacturer and user may face violations of Federal or State Codes. However, by just making transit mixers longer, particular multiaxle trucks, manueverability problems exist at the job site. Also, in the longer transit mixer configurations insufficient drive wheel traction can occur when at the job site, thus reducing the ability of the trailer transit mixer to negotiate adverse terrain. There are still further State and Federal highway regulations that limit the magnitude of weight allowable on any single axle or on tandem axles.

SUMMARY OF THE INVENTION

To provide optimum maneuverability at the construction site while increasing road stability and load carrying capability, a trailer transit mixer with a large sized mixing drum is disclosed in alternative configurations. In its extended state, the trailer transit mixer has the optimum allowable distribution of weight per axle for the length and axle separation, as well as heighth limitations, thus complying with the applicable Federal and State Highway Regulations. By this feature greater pay load capability is realized thus reducing the cost per load. In the contracted state, improved maneuverability and drive wheel traction are achieved. Moreover, in the contracted state, the open discharge end of the mixing drum is elevated to provide a greater span of reach for the discharge chutes. Also, the discharged is at the front of the truck allowing the driver to easily and accurately position the truck-trailer for concrete discharge.

The trailer transit mixer of the present invention includes front and rear pairs of pivotable support members extending from the mixer drum support center frame or elements. The rear support members are pivotably attached to a trailer wheel assembly while the front support members are pivotally attached to the conventional fifth wheel assembly of the truck, sometimes referred to as the tractor. The trailer transit mixer includes a center frame assembly which is pivotally attached to the ends of the upperwardly extending pairs of support members. The center frame rotatably supports the mixer drum or the rotatable drum structure itself may act as the center frame.

Power units are secured to and extend between the support members and the center frame to accomplish the contraction or expansion of the trailer transit mixer length depending upon whether the mixer is in transit or at the construction site.

The length and angular movement of the support members are such that in the contracted configuration the discharge is raised to a higher level and positioned at the front of the truck thereby increasing discharge versatility and efficiency. With this feature, the trailer transit mixer in its extended configuration also comes within the height requirements specified by various Federal and State Highway Regulations.

Therefore, it is an object of the present invention to provide a trailer transit mixer with a selectively contracted and expanded wheel base configuration with the most desirable operating characteristics in both configurations.

It is another object of the present invention to provide a trailer transit mixer with power units operable to change the trailer configuration to provide increased loading of the drive wheels for traction when at the construction site.

It is still another object of the present invention to provide a trailer transit mixer which has increased maneuverability at the construction site by decreasing its overall length.

It is still another object of the present invention to provide a transit mixer which has a lower center of gravity when in road use yet able to discharge concrete from a raised position when at the job site.

It is still another object of the present invention to increase discharge efficiency by providing a raised, fully pivotable, discharged chute at the front of the vehicle.

It is still another object of the present invention to increase loading capacity yet remain within Federal and State regulations regarding height, weight per axle and truck length.

It is yet another object of the present invention to increase road maneuverability when in the unloaded state by being able to contract the trailer assembly.

It is yet another object of the present invention to provide a trailer transit mixer that uses a conventional truck and fifth wheel mount assembly which permits selected use of either a contractable trailer transit mixer or other conventional trailers.

With these and other objects in view, the invention consists of the construction, arrangement and combination of the various parts of the trailer transit mixer whereby the objects contemplated are attained, as hereinbefore set forth, pointed out in the appending claims and illustrated in the accompanying drawings.

IN THE DRAWINGS

FIG. 5 is a side elevation view of a third form of trailer transit mixer in the extended position.

FIG. 6 is a side elevation view of the third form of trailer transit mixer shown in FIG. 5 in the contracted position.

FIG. 7 is a rear elevation view of the third form of trailer transit mixer illustrated in FIGS. 5 and 6.

FIG. 8 is an enlarged sectional side view of one form of fifth wheel mounting arrangement that is generally shown in FIGS. 1 through 4 but also is usable with the form shown in FIGS. 5 through 7.

DESCRIPTION OF THE PREFERRED EMBODIMENT

Figure 1:
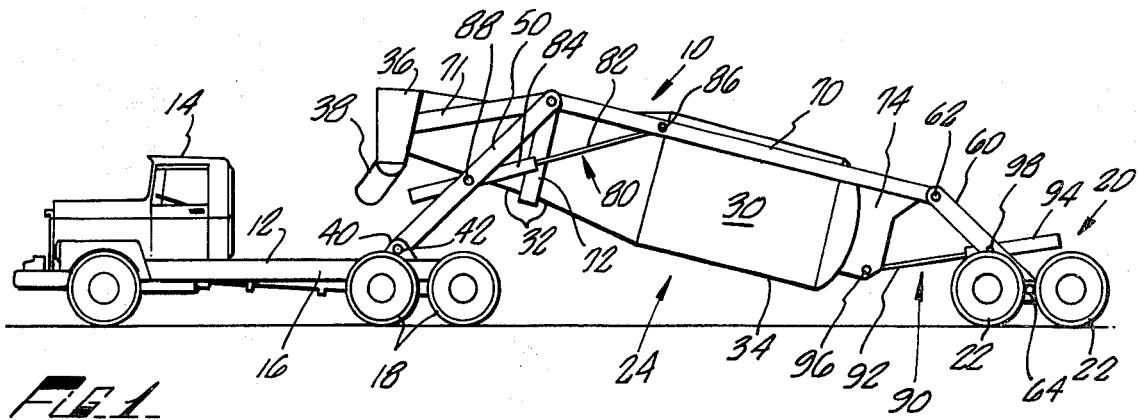
FIG. 1 is a side elevation view of one form of the trailer transit mixer in the extended position.
Figure 2:
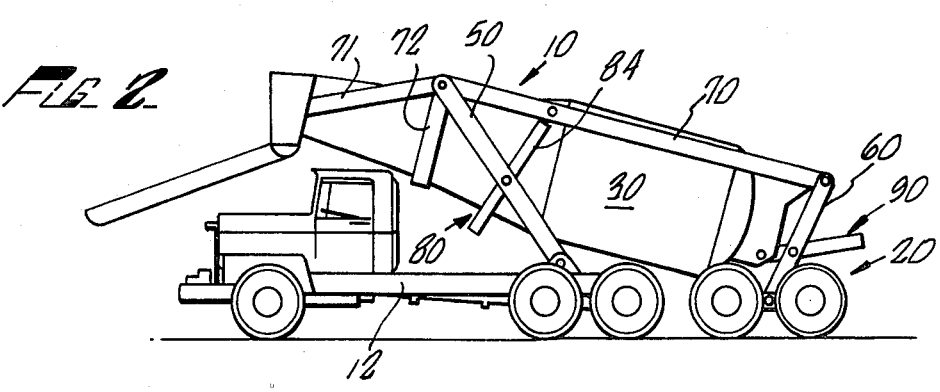
FIG. 2 is a side elevation view of the trailer transit mixer of FIG. 1 in the contracted position.

As illustrated in FIGS. 1 and 2, a trailer transit mixer, generally designated as 10, has a conventional forward truck or tractor unit 12 having a cab section 14 and a rear section 16 with conventional tandem drive wheels 18. The trailer transit mixer 10 also has a rear wheel assembly 20, which in the preferred embodiment consists of tandem axels with wheels 22 mounted thereon. The trailer portion 24 of the trailer transit mixer 10 extends generally from the rear section 16 to the rear wheel assembly 20.

The trailer transit mixer 10 has a mixer drum 30 which includes a forward conical section 32 and a generally cylindrical rear mixer body 34. A trailer frame 70 rotatably supports the mixer drum and a frame section 71 extends forwardly to support a discharge body or hopper 36 at the open end of the drum. A discharge chute 38 is attached to hopper 36 and has 180° or greater freedom of movement. The discharge chute may be provided with conventional means for causing its rotation or changing its angle of inclination.

A fifth wheel assembly 40 is secured to the rear section 16 of the truck and provides for the normal freedom of movement of the trailer portion 24 relative to the truck 12 for turning. The fifth wheel assembly 40 has a pair of front pivots 42 adapted to support a pair of substantially parallel first support arms 50 of the trailer portion 24 to allow pivoting of the trailer relative to the truck about a transverse axis as the vehicle travels over uneven terrain.

Means are provided for causing the mixer drum 30 and trailer portion 24 to move between an extended position rearwardly of the truck 12 to a contracted position with a substantial portion of the mixer drum positioned over the truck and, as shown in the drawings, these means may include the arms 50 pivotably secured to the trailer frame 70 and power elements 80 for causing the pivoting. The pair of first power elements 80 each have a rod portion 82 and piston portion 84. The rod portion 82 of each is pivotally attached to the frame 70 at pivot 86 and the piston portion 84 of each is pivotally attached to the coplanar first arm 50 at pivot 88. The extension and retraction of the power elements 80 will cause the arms 50 to pivot and in turn cause the mixing drum and trailer to move between the extended and contracted, respectively, positions relative to the truck, as shown in FIGS. 1 and 2.

Similarly, means are provided for causing the rear tandem axel wheels 22 of the trailer to extend rearwardly beyond the mixer drum 30 or retract under or at least closer to the mixer drum and, as shown in the drawings, these means may include support arms 60 pivotally connected between the rear wheel 20 and the trailer frame 70 and power elements 90 for causing pivoting. The pair of substantially parallel second arms 60 are pivotably attached to the rear wheel assembly 20 at rear pivots 64. The second arms 60 each have a second swivel pin 62 by which they are pivotably secured to the frame 70. This arrangement also provides for pivoting of the wheel assembly 20 as the tandem axel wheels 22 proceed over bumps and dips. The pair of second power elements 90 have a rod portion 92 and a piston portion 94. The rod portion 92 of each is attached to the second cradle 74 at a pivot 96 and the piston portion 94 of each is attached to the coplanar second arm 60 at a pivot 98.

The frame 70 has a first cradle 72 and a second cradle 74 attached thereto and suspended therefrom. The first cradle 72 and the second cradle 74 rotatably support the mixer drum 30 by customary methods on the frame 70. As stated earlier, the frame 70 is pivotably attached to and supported by the first arms 50 at swivel pins 52 and the second arms 60 at second swivel pins 62.

In FIG. 2, the trailer transit mixer 10 is shown in the contracted configuration. The rear wheel assembly 20 is brought into closer proximity with the rear section 16 by the combined action of the first power elements 80 and the second power elements 90. By actuating the first power elements 80 the telescoping action reduces the obtuse angle between the first arms 50 and the frame 70 to an acute angle. Similarly, by actuating the second power elements 90 the telescoping action reduces the obtuse angle between the second arms 60 and the frame 70 to an acute angle. The transverse or lateral pivotal axes provided by parallel pivots 42, swivel pins 52, swivel pins 62, and rear pivots 64 permit contraction of the trailer portion 24. This contraction moves the center of gravity of the trailer portion 24 toward the truck 12 thereby causing increased weight upon the drive wheels 18 to improve their traction capability. This contraction simultaneously raises the discharge means 36 to a higher level thereby improving the discharge capability of the chute 38.

In the extended position as shown in FIG. 1, a lower center of gravity for the trailer transit mixer 10 is accomplished due to lowering the mixer drum and frame, as well as a lower weight per axle and longer unit length are provided. Turning capability is retained in either the contracted or expanded configuration because of the rotably mounted fifth wheel assembly 40, however increased maneuverability is shown in the contracted configuration because of a reduced length.

In the above-described embodiment, trailer transit mixer 10, of this invention and in the embodiments described hereinafter, appropriate conventional means (not shown) are provided for selectively causing rotation of the mixer drum in either direction about its inclined axis for mixing and discharging the concrete. Such means may comprise an auxiliary engine mounted on the trailer frame or rear wheel assembly for powering conventional means, such as a transmission and chain drive or hydraulic pump and motor drive, or even a power take-off from the truck's engine, driving an hydraulic pump which in turn drives an hydraulic motor and gear drive mounted on the end of the mixer drum as described in U.S. Pat. No. 3,658,303.

Figure 3:
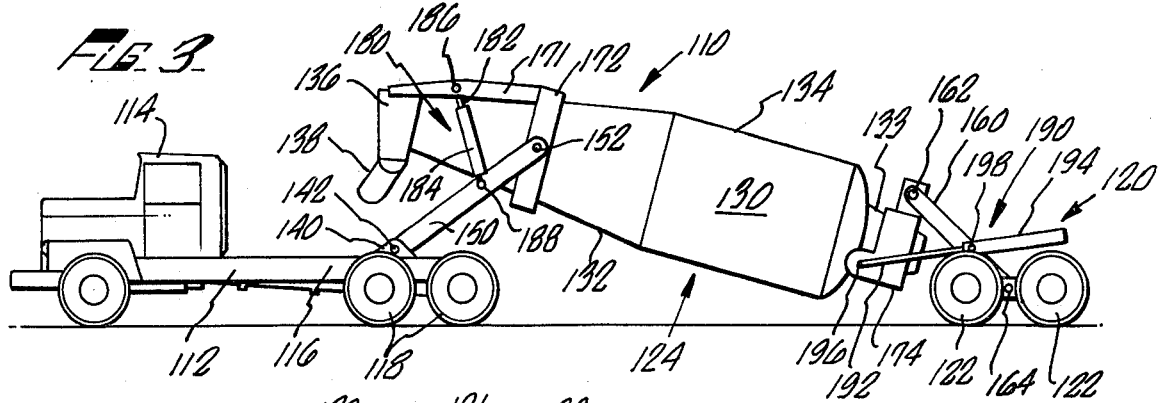
FIG. 3 is a side elevation view of another form of a contractable trailer transit mixer in the extended position.
Figure 4:
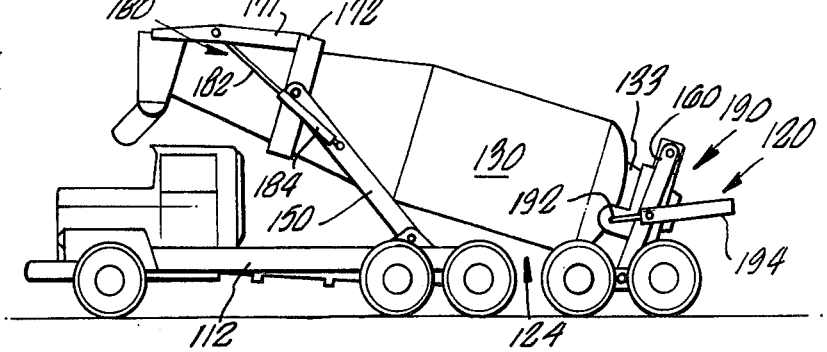
FIG. 4 is a side elevation view of the trailer transit mixer illustrated in FIG. 3 in the contracted position.

An alternative configuration of a trailer transit mixer, generally designated as 110, is illustrated in FIGS. 3 and 4. In general, a pair of drive wheels 118 are mounted to a rear truck platform 116; a rear wheel assembly 120 has mounted thereon a pair of tandem wheels 122; and a trailer portion 124 extends from the rear platform 116 to the rear wheel assembly 120, all similar to the first embodiment of FIGS. 1 and 2.

A mixer drum 130 has a forward conical section 132 and a cylindrical rear section 134. The drum 130 has a rearward extension 133 that is rotatably supported by a cradle frame 174 which may also include the means for driving the drum. A frame section 171 extends forwardly from the front cradle frame 172 and supports a discharge hopper 136 at the open end of the drum. The discharge hopper 136 has a chute 138 pivotally attached thereto which has a 180° or greater freedome of movement.

The rear truck platform 116 has a fifth wheel assembly 140 rotably attached thereto providing horizontal freedom of movement for the trailer portion 124. The fifth wheel assembly 140 has lower pivots 142 adapted to support a pair of first support members 150 with the first support members 150 each having an upper swivel pin 152 pivotably attached to a cradle frame 172. A pair second support members 160 each have an upper swivel pin 162 pivotally connected to cradle frame 174 and a lower pivot 164 pivotally attached to the rear wheel assembly 120.

In summary, the frame section 171 has a support or cradle frame 172 rigidly attached thereto which rotatably supports the front of the mixer drum 130; the frame 172 being pivotally secured to the first support members 150 by swivel pins 152. A second support or cradle frame 174 supports section 133 at the rear of the drum 130 and is pivotably secured to the second support members 160 by swivel pins 162. In this manner the drum itself forms an integral part of the frame of trailer 124.

A pair of first power elements 180 each have a rod portion 182 and a piston portion 184, wherein the rod portion 182 of each is attached to the frame 170 at an upper pivot 186, and the piston portion 184 of each is attached to the coplanar first support member 150 at lower pivot 188 and to the frame section 171 at pivot 186. A pair of second power elements 190 each have a rod portion 192 and a piston portion 194, wherein the rod portion 192 of each is attached to the cradle frame 174 by a first pivot 196 and the piston portion 194 of each is attached to the coplanar second support member 160 at a second pivot 198.

In FIG. 4, the trailer transit mixer 110 is shown in a contracted configuration. Briefly, the first power elements 180 when actuated impart a force upon the frame section 171 thereby increasing the obtuse angle between the frame section 171 and the first support members 150. The first power elements 180 pivot about their respective upper pivots 186 and similarly pivot about their respective lower pivots 188, thus facilitating the movement of the frame members 171 and 172 respective to the members 150.

At the rear wheel assembly 120, the second power elements 190 impart a force upon the cradle frame 174 and a similar force on the second support members 160. This action reduces the angle between the cradle frame 174 and the second support members 160, thereby causing the desired contracted configuration. The second power elements 190 pivot about their respective first pivots 196 and similarly pivot about their respective second pivots 198.

When contracted, the trailer transit mixer 110 is provided with greater horizontal maneuverability by reducing the length of the trailer portion 124. As stated with respect to the first configuration, in the contracted state the trailer transit mixer 110 has greater drive capability because of the added axle loading over the drive wheels 118. Similarly, the discharge chute 138 is raised to a superior position due to the repositioning of the first support members 150. This provides for greater operational flexibility in the discharge of the mixture contained within the drum 130.

In FIGS. 5, 6, and 7, a third alternative embodiment of a trailer transit mixer of this invention is illustrated and designated generally 210. It consists of a rear platform 216 upon which tandem drive wheels 218 are mounted; a rear wheel assembly 220 which has tandem wheels 222 mounted thereon and a trailer portion 224 which extends from the rear platform 216 to the rear wheel assembly 220.

A mixer drum 230 has a conical section 232 and cylindrical rear mixer section 234. An accumulator and discharge device 235 and an upper charging hopper 236 are mounted on frame sections 271 and 271a extending forwardly along the conical drum section 232. A discharge chute 238 attached to the discharge device 235 has a chute extension 237 attached by a hinge 239 which provides for extended operation and compact storage in transit.

A fifth wheel assembly 240 has a pair of front pivots 242 adapted to provide longitudinal support and rotation for first carriage members 250. The fifth wheel assembly 240 in addition has a lower fifth wheel assembly 244 rotatably secured thereto. The lower fifth wheel assembly 244 has a fulcrum 245 which attaches it to a truck fifth wheel assembly 246, this assembly 246 providing turning capability for the trailer portion 224. A locking member, not shown, extends between the fifth wheel assembly 240 and the lower fifth wheel assembly 244 when the trailer portion 224 is being used to prevent pivoting about both of the two parallel axes thereof. Removal of the locking member provides for attachment of other trailer forms to the conventional, pivoting lower fifth wheel assembly 244 in the normal manner.

A pair of first carriage members 250 each have an upper swivel pin 252 within a mount 254 secured to a frame 270. Additionally, the first carriage members 250 each have a power element mount 258 along their length. The first carriage members 250 are pivotably secured to the fifth wheel assembly 240 at front pivots 242, which provide for pivoting of the first carriage members 250 on the lateral or transverse axis depending upon the terrain area which the trailer is to travel.

A pair of second carriage members 260 each have swivel pins 262 within a pair of mounts 264 attached to the frame 270. The second carriage member 260 are pivotably attached to the rear wheel assembly 220 at rear pivots 264, this configuration providing pivoting of the second carriage members 260 about the lateral or transverse axis.

A frame 270 has a pair of first support legs or cradles 272 and a pair of second support legs 274 extending therefrom and rotatably suspending the drum 230. The frame 270 also has a pair of angular support beams 275 and a pair of support braces 276 attached thereto, wherein the pair of angular support beams 275 are rigidly secured to the support legs 274 as are the support braces 276.

A pair of first power elements 280 each have a rod portion 282 and piston portion 284 adapted for telescopic movement. The rod portion 282 of each is attached to the coplanar first carriage member 250 at the mount 258 by an upper pivot 286. The piston portion 284 of each first power element 280 is attached to the second support leg 274 at a lower pivot 288.

A pair of second power elements 290 each have a rod portion 292 and a piston portion 294 also adapted for telescopic movement. The rod portion 292 of each is attached to the coplanar second carriage member 260 at an upper pivot 296. The piston portion 294 of each second power element 290 is attached to the coplanar second support leg 274 by a lower pivot 298.

For elevating and lowering the discharge chute 238, a third power element 300 is attached between the chute 238 and the discharge accumulator 235 and may be operated remotely, as is relatively conventional. Also, remotely controlled means, not shown, may be used for pivoting the discharge chute to aim in the desired direction.

Referring to FIG. 5, the trailer transit mixer 210 is illustrated in a contracted configuration. The first power elements 280 act upon the first carriage members 250 and the second support legs 274 of frame 270. The second power elements 290 act upon the second carriage members 260 and the second support legs 274 of frame 270. By this combined action the trailer portion 224 is contracted thus causing a forward and upward shifting of the mixer drum 230.

As stated previously, the fifth wheel assembly 240 is attached to the lower fifth wheel assembly 244 via a lock when the trailer transit mixer 210 is to be used for concrete hauling and mixing functions. The same truck unit 212 may be used with the second fifth wheel assembly 246 and the upper wheel assembly 244 when the lock is not present to haul other trailer rigs. In this manner maximum flexibility is attained and various functions may be performed by the truck portion 212.

In FIG. 7, a rear elevation of the trailer transit mixer 210 is illustrated. Briefly, the drum 230 is rotatably suspended in the frame 270 and the angular frame forming the carriage members 260 are illustrated. The pivotal attachment of the second power elements 290 to the carriage members 260 at 296 are shown. Also, the drum drive and support mechanism 302 is shown and may be of the type described in U.S. Pat. No. 3,658,303 as previously mentioned.

In FIG. 8, the preferred form of fifth wheel attachment assembly, generally designated 340, is shown. A conventional, rigid-type fifth wheel 341 is fixedly mounted on the truck frame portion 416 and has an upper support surface 343 on which a plate 304 of bracket 306 is supported. Bracket 306 contains the pivot 342 equivalent to pivots 42, 142, and 242 heretofore described for pivotally mounting the carriage member 350 of the trailer. The plate 304 has a downwardly extending pin 308 with an enlargement for engaging the slot 309 in the fifth wheel 341 in the conventional manner.

In all of the above configurations, the same basic objectives are achieved. When in road use, the trailer transit mixers 10, 110, 210 have a low center of gravity thereby providing improved road handling. When at the construction site the contracted configuration of the trailer transit mixers 10, 110, and 210 provides greater traction by the drive wheels 18, 118 and 218. Similarly, the discharge chutes 38, 138, 238, are raised to a higher position because of the lengths and angular positions of the members 50, 150, 250. In each instance turning capability between the truck and trailer is provided by the fifth wheel assembly 40, 140, 240 and greater maneuverability arises in the contracted state due to the shorter overall length. Also in each configuration, the extended form increases the pay load capability thereby decreasing the cost per unit of concrete shipped.

Referring briefly to FIGS. 5, 6, and 7, an illustration of the axle loading for the preferred embodiment will be described. As discussed earlier, the Federal law allows 80,000 lbs. gross weight for trailers of a length in excess of 50 feet 6 inches between extreme axles. In the preferred embodiment, the transit mixer is 50 feet 9 inches in the expanded configuration from front axle 213 to rear axel 221. In the contracted configuration, the transmit mixer is only about 36 feet in overall length and only about 27 feet between extreme axles, a contraction of about 23 feet. The axle loading of the tractor tandem wheels 218 and the trailer tandem wheels 222 are each equal at 34,000 lbs. in the expanded configuration, however, it changes to 50,000 lbs. on tractor wheels 218 and 15,000 lbs. on trailer wheels 222 when the contracted configuration is to be utilized. The 50,000 lbs. acts directly upon the drive wheels 218 thereby improving their traction.

In the preferred embodiment, the axle distribution per unit length permits a payload of 11 to 12 cubic yards of concrete to be hauled. This is approximately 150% of the carrying capability of a contemporary 3 axle transit mixers and more than 125% of the load carrying capability of a contemporary 4 axel transit mixers under the same weight law regulations. Thus this increased carrying capability dramatically reduces the cost of transportation and energy requirements in concrete construction. Also, in the preferred embodiment, the height of the transit mixer increases from 11 feet 8 inches to 14 feet 10 inches thus increasing the discharge radius and/or angle at the construction site while nonetheless remaining within the applicable laws regarding maximum height while on the road.

Having fully described my invention, it is to be understood that I do not wish to be limited to the details herein set forth, but that my invention is of the full scope of the appended claims.

I claim:

1. In a trailer transit mixer for use with a truck having a fifth wheel assembly, the improvement comprising, a mixer drum assembly including a mixer drum and means operatively supporting said drum, a trailer wheel assembly, means supporting one end of said mixer drum assembly on said trailer wheel assembly and selectively operable to shift the longitudinal position of said drum relative to said trailer wheel assembly, means supporting the other end of said mixer drum assembly on the truck fifth wheel assembly and selectively operable to shift the longitudinal position of said drum relative to the truck, the selective operation of said supporting means causing the said other end of said mixer drum to extend over the front of the truck without obstructing movement of the truck, and said other end having an opening and means associated therewith for discharging the contents of said mixer drum beyond the front of the truck.

2. The trailer transit mixer of claim 1, wherein said selectively operable means supporting said mixer drum assembly include pivotal mounted support arms and power means for causing pivoting of said arms to shift the longitudinal position of said mixer drum.

3. The trailer transit mixer of claim 2, wherein a first pair of said arms support said mixer drum assembly from said trailer wheel assembly and a second pair of said arms support said mixer drum assembly from the truck fifth wheel assembly.

4. The trailer transit mixer of claim 2 or 3, wherein said power means includes hydraulic piston and cylinder means connected to said arms.

5. The trailer transit mixer of claim 1, wherein said selective operation shifts the trailer wheel assembly between a first position for highway operation with the mixer drum loaded with the trailer wheel assembly a substantial distance rearward of the truck and a second position with the trailer wheel assembly position near the truck for off-highway and unloaded on-highway operation.

6. In a trailer transit mixer employing an elongated mixer drum with means for operating the drum to mix concrete and having a discharge at one end and a truck having a fifth wheel assembly for trailers, the improvement comprising, means supporting the discharge end of the mixer drum on the fifth wheel assembly for allowing complete articulated movement between the truck and mixer drum for towing of the mixer drum by the truck, a trailer wheel assembly, means supporting the other end of the mixer drum on said trailer wheel assembly normally spaced substantially rearwardly of the truck for in transit operation, and said support means operable to shift the mixer drum forwardly and upwardly into a contracted position with the discharge end located above and near the front of the truck for discharging concrete forwardly without inhibiting truck turning and operation.

7. In a trailer transmit mixer employing an operable mixer drum having a discharge at one end and a truck having a fifth wheel assembly for towing trailers, the improvement comprising, means supporting the discharge end of the mixer drum on the fifth wheel assembly for allowing normal towing of the mixer drum by the truck, a trailer wheel assembly having means supporting the other end of the mixer drum on ground-contacting wheels spaced substantially rearwardly of the truck for in transit operation to distribute the load among the truck and trailer wheels, said support means operable to shift the mixer drum forwardly and upwardly into a contracted position with the discharge end located above and near the front of the truck for discharging concrete forwardly without inhibiting truck turning and operation and the trailer wheels positioned close to the truck, said forward shifting of the mixer drum increasing the load on the truck rear wheels for increased traction.

8. A transit mixer, said mixer comprising, a truck tractor unit, a fifth wheel assembly rotably attached to said truck tractor unit, a rear wheel assembly, a first arm means extending upwardly from said fifth wheel assembly and pivotably attached thereto, a second arm means extending upwardly from said rear wheel assembly and pivotably attached thereto, a mixer drum assembly pivotably attached to said first arm means and said second arm means, and power means operatively connected to said first arms and second arms means for causing pivoting of said arm means and forward shifting of said mixer drum assembly.

9. The transit mixer of claim 8, wherein said mixer drum assembly comprises frame means rotatably supporting a mixer drum adapted for carrying a mixture.

10. The transit mixer of claims 8 or 9, wherein the first arm means is longer than the second arm means.

11. A transit mixer, said mixer comprising, a tractor unit having an extended platform, a horizontally rotatable fifth wheel assembly attached to said platform, a first arm means pivotably attached to said fifth wheel assembly extending upwardly therefrom, a rear wheel assembly, a second arm means pivotably attached to said rear wheel assembly extending upwardly therefrom, said second arm means being shorter than said first arms means, a frame having a cradle attached thereto, said frame pivotably attached to said first and second arm means, a mixer drum rotatably supported by said cradle, a discharge device attached to said frame in operable association with said mixer drum, a first power means attached to said first arm means and said frame, a second power means attached to said second arm means and said frame, and said first and second power means being selectively operable to cause pivoting of said arm means and movement of said mixer drum between a position primarily rearward of said tractor unit and a position substantial over said trailer unit.

12. A transit mixer, said mixer comprising, a truck tractor unit, a lower fifth wheel assembly attached to said tractor unit, an upper fifth wheel assembly pivotably attached to said lower fifth wheel assembly, a second lower fifth wheel assembly rotatably attached to said upper fifth wheel assembly, a first carriage means pivotably attached to said second lower fifth wheel assembly and extending upwardly therefrom, a rear wheel assembly, a second carriage means pivotably attached to said rear wheel assembly and extending upwardly therefrom, a frame having a rear mount assembly, a mixer drum and discharge device attached to said frame, a first power means pivotably attached to said first carriage means and said rear mount assembly, and a second power means pivotably attached to said second carriage means and said rear mount assembly.

* * * * *